(12) United States Patent
Passot et al.

(10) Patent No.: US 8,877,401 B2
(45) Date of Patent: Nov. 4, 2014

(54) METHOD FOR OPTIMIZING THE FEED OF FUEL COMPRISING A CARBONYL-CONTAINING COMPOUND TO THE CATALYTIC ELECTRODE OF A FUEL CELL STACK

(71) Applicant: Commissariat a l'Energie Atomique et aux Energies Alternatives, Paris (FR)

(72) Inventors: Sylvain Passot, Tullins (FR); Olivier Lemaire, Les Abrets (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 10 days.

(21) Appl. No.: 13/900,370

(22) Filed: May 22, 2013

(65) Prior Publication Data

US 2013/0323617 A1 Dec. 5, 2013

(30) Foreign Application Priority Data

May 29, 2012 (FR) ...................................... 12 54923

(51) Int. Cl.
*H01M 8/04* (2006.01)
*H01M 8/10* (2006.01)
*H01M 8/06* (2006.01)

(52) U.S. Cl.
CPC ........ *H01M 8/0444* (2013.01); *H01M 8/04447* (2013.01); *Y02E 60/50* (2013.01); *H01M 2008/1095* (2013.01); *H01M 8/0668* (2013.01); *H01M 8/04388* (2013.01); *H01M 8/04753* (2013.01); *H01M 8/04552* (2013.01)
USPC .............................. 429/443; 429/444; 429/502

(58) Field of Classification Search
CPC .......... H01M 8/04447; H01M 8/0668; H01M 8/04388; H01M 8/04753; H01M 8/04552; H01M 8/0444; H01M 2008/1095; Y02E 60/50
See application file for complete search history.

(56) References Cited

U.S. PATENT DOCUMENTS

| | | | |
|---|---|---|---|
| 5,925,476 A | 7/1999 | Kawatsu | |
| 6,063,516 A | 5/2000 | Grot et al. | |
| 6,066,410 A | 5/2000 | Auer et al. | |
| 2010/0112401 A1* | 5/2010 | Noto et al. | ...... 429/23 |
| 2010/0227756 A1* | 9/2010 | Kim et al. | ...... 502/101 |
| 2010/0248086 A1* | 9/2010 | Nobuhara et al. | ...... 429/524 |

(Continued)

FOREIGN PATENT DOCUMENTS

| | | |
|---|---|---|
| EP | 0911898 A1 | 4/1999 |
| FR | 2937139 A1 | 4/2010 |
| JP | 644995 A | 2/1994 |

OTHER PUBLICATIONS

Jingxin Zhang, et al., "Influence of Anode Flow Rate and Cathode Oxygen Pressure on CO Poisoning of roton Exchange Membrane Fuel Cells", Journal of the Electrochemical Society, Apr. 25, 2002, pp. A765-A772, vol. 149, No. 6, XP002692554.

(Continued)

*Primary Examiner* — Raymond Alejandro

(74) *Attorney, Agent, or Firm* — Baker Hostetler LLP

(57) ABSTRACT

A method for optimizing fuel feed of a fuel cell stack catalytic electrode, the fuel cell stack containing a cell comprising a proton exchange membrane located between said catalytic electrode and another electrode, operating in superstoichiometric mode, said fuel comprising a carbonyl-containing polluting agent compound reacting on said catalytic electrode, comprises: defining a reference voltage for said cell when fed with a fuel exempt from polluting agent; defining a threshold voltage corresponding to a preset operating voltage of said cell as a percentage of reference voltage; defining a calibration curve for given operating conditions, relating threshold voltage to flow rate of polluting agent and allowing a first parameter of flow rate of polluting agent to be defined; detecting polluting agent to define a second parameter corresponding to content of polluting agent present in said fuel; and determining a maximum stoichiometry coefficient for said fuel stream, depending on said two parameters.

7 Claims, 3 Drawing Sheets

(56) References Cited

U.S. PATENT DOCUMENTS

2011/0207019 A1* 8/2011 Mukerjee .................... 429/487
2011/0240488 A1 10/2011 Lemaire et al.

OTHER PUBLICATIONS

Shimshon Gottesfeld, et al., "A New Approach to the Problem of Carbon Monoxide Poisoning in Fuel Cells Operating at Low Temperatures", Journal of the Electrochemical Society, Oct. 1, 1988, pp. 2651-2652, XP000147427.

Qingfeng Li, et al., "The CO Poisoning Effect in PEMFCs Operational at Temperatures up to 200C", Journal of the Electrochemical Society, 2003, pp. A1599-A1605, vol. 150, No. 12, The Electrochemical Society, Inc.

* cited by examiner

METHOD FOR OPTIMIZING THE FEED OF FUEL COMPRISING A CARBONYL-CONTAINING COMPOUND TO THE CATALYTIC ELECTRODE OF A FUEL CELL STACK

CROSS-REFERENCE TO RELATED APPLICATION

This application claims priority to foreign French patent application No. FR 1254923, filed on May 29, 2012, the disclosure of which is incorporated by reference in its entirety.

FIELD OF THE INVENTION

The field of the invention is that of proton exchange membrane fuel cells (PEMFCs).

BACKGROUND

PEMFCs are current generators the operating principle of which is based on the conversion of chemical energy into electrical power via a catalytic reaction of hydrogen and oxygen. Membrane electrode assemblies (MEAs), commonly called cell cores, are the basic elements of PEMFCs. They are composed of a polymer membrane and of the catalytic layers present on either side of the membrane. The membrane therefore separates the anode compartment and the cathode compartment. The catalytic layers generally consist of platinum nanoparticles supported by carbon aggregates (generally carbon black). Gas diffusion layers (carbon cloth, felt, etc.) are placed on either side of the MEA and serve as electrical conductors and ensure the uniform delivery of reactive gases and the removal of the water produced. At the anode, decomposition of the hydrogen adsorbed on the catalyst produces protons $H^+$ and electrons $e^-$. The protons then pass through the polymer membrane before reacting with oxygen at the cathode. Reaction of the protons and the oxygen at the cathode leads to the formation of water and to the production of heat, as shown in FIGS. 1a and 1b.

Depending on the method used to produce the hydrogen, the gas may contain impurities. It has been shown that carbon monoxide and sulfur-containing compounds have a particularly adverse effect on the operation of the cell. In this context, maximum concentration thresholds have been set in order to standardize the quality of the hydrogen used in fuel cells: 0.2 µmol/mol for CO and 0.004 µmol/mol for sulfur-containing compounds in the case of automotive applications, for example. These values, which were set by a technical standards committee, are subject to change.

In the case where the hydrogen is produced by reforming, CO is the impurity that is mainly present.

Regarding the impact of CO on the performance of a PEMFC electrode, it is widely recognized that CO poisons platinum-based catalysts. Specifically, this molecule is very strongly adsorbed on catalytic sites, thus rendering them inactive. PEM fuel cells commonly use platinum-based catalysts. The reformed hydrogen feed of a PEM fuel cell may contain traces of CO resulting in a loss in the performance of the stack. This performance loss is due to poisoning of platinized anode catalytic sites by CO which is adsorbed (1) and therefore prevents steps in the hydrogen oxidation reaction (2).

$$Pt + CO \rightarrow Pt-CO \quad (1)$$

$$\left.\begin{array}{l} Pt + H_2 \rightarrow 2Pt-H \\ Pt + H_2 \rightarrow Pt-H + H^+ + e^- \\ Pt-H \rightarrow Pt + H^+ + e^- \end{array}\right\} \quad (2)$$

The overall hydrogen oxidation reaction is therefore the following:

$$H_2 \rightarrow 2H^+ + 2e^- \quad (3)$$

A number of solutions have already been proposed for reducing or eliminating the impact of CO on the performance of the electrode by promoting oxidation of CO to $CO_2$ according to reaction (4).

$$Pt\text{---}CO + H_2O \rightarrow Pt + CO_2 + 2H^+ + 2e^- \quad (4)$$

Solution Involving High-Temperature Operation

It has been reported that operating a fuel cell stack at a temperature of 90° C. to 200° C. allows the tolerance to CO to be improved. Li et al. reported a tolerance to 3% CO in hydrogen at 200° C., as described in the article by Q. Li, R. He, J.-A. Gao, J. O. Jensen, N. J. Bjerrum: *J. Electrochem. Soc.*, 150 (2003) A1599-A1605.

Operation at 90° C. to 120° C. nevertheless reduces the durability of the MEAs. Operation at temperatures from 125° C. to 200° C. requires the use of membranes other than the perfluorosulfonic acid (PFSA) membranes commonly used, such as for example polybenzimidazole (PBI) membranes. However, these membranes have the disadvantage of having a lower proton conductivity than PFSA membranes and the performance obtained is therefore not as good.

Solution Involving the Use of a CO-Tolerant Catalyst:

This solution consists in using a CO-tolerant catalyst such as for example a platinum/ruthenium alloy such as described in the by E. Auer, W. Behl, T. Lehmann, U. Stenke: Anode catalyst for fuel cells with polymer electrolyte membranes, US006066410A, 2000.

CO oxidizes at a lower potential on the Pt/Ru alloy than on pure platinum, thus allowing regeneration of the catalytic sites.

Although the Pt/Ru alloy provides a better performance in the presence of CO, this type of catalyst has problems with durability notably due to dissolution of the ruthenium which irreversibly degrades performance.

Solution Involving the Adding of Trace Amounts of Oxygen to the Hydrogen in Order to Oxidize the CO, i.e. "Air Bleeding"

Thus, it has been proposed to inject a low concentration of oxygen into the fuel gas in order to oxidize the CO and thus prevent poisoning of the catalytic sites, as described in the article by S. Gottesfeld, J. Pafford: J. Electrochem. Soc., (1988) 2651-2652.

For example, 4.5% oxygen in hydrogen containing 100 ppm CO allows all the CO to be oxidized and thus the same performance to be obtained as in pure hydrogen.

However, this method has the disadvantage of increasing the risk of degrading performance because of the presence of oxygen at the anode. Specifically, reduction of oxygen at the anode is the cause of the main effects responsible for degradation of PEM cell stacks (corrosion of the carbon support at the cathode, chemical degradation of the membrane, and loss of gas diffusion layer (GDL) hydrophobicity).

SUMMARY OF THE INVENTION

In this context, the subject of the present invention is a novel solution allowing the loss in the performance of the electrode due to poisoning of catalytic sites by CO to be limited by modifying the operating conditions of the system.

More precisely, the subject of the present invention is a method for optimizing the fuel feed of a fuel cell stack catalytic electrode, the fuel cell stack containing a cell comprising a proton exchange membrane located between said catalytic electrode and another electrode, and operating in a superstoichiometric mode, said fuel comprising at least one carbonyl-containing polluting agent compound, said compound reacting on said catalytic electrode, characterized in that it comprises the following steps:

defining a reference voltage for said cell when fed with a fuel exempt from polluting agent;

defining a threshold voltage corresponding to a preset operating voltage of said cell equal to a percentage of said reference voltage;

defining a calibration curve for given operating conditions, relating said threshold voltage to a flow rate of polluting agent and allowing a first parameter corresponding to the flow rate of polluting agent to be defined;

detecting the amount of polluting agent in order to define a second parameter corresponding to the content of polluting agent present in said fuel; and determining a maximum stoichiometry coefficient for said fuel stream, depending on said two parameters, under given operating conditions.

According to one variant of the invention, the fuel is based on hydrogen.

According to one variant of the invention, the fuel is based on reformed hydrogen.

According to one variant of the invention, the fuel comprises a carbonyl-containing polluting agent, possibly CO.

According to one variant of the invention, the threshold voltage is equal to about 90% of the reference voltage.

According to one variant of the invention, the means for detecting said polluting agent comprise a probe formed from a small PEM cell and fed with the fuel stream.

According to one variant of the invention, the means for detecting said polluting agent comprise means for detecting cell voltage oscillations allowing the content of carbonyl-containing polluting species to be defined.

BRIEF DESCRIPTION OF THE DRAWINGS

The invention will be better understood and other advantages will become apparent on reading the following nonlimiting description and by virtue of the appended figures, in which.

DETAILED DESCRIPTION

Figure 1:
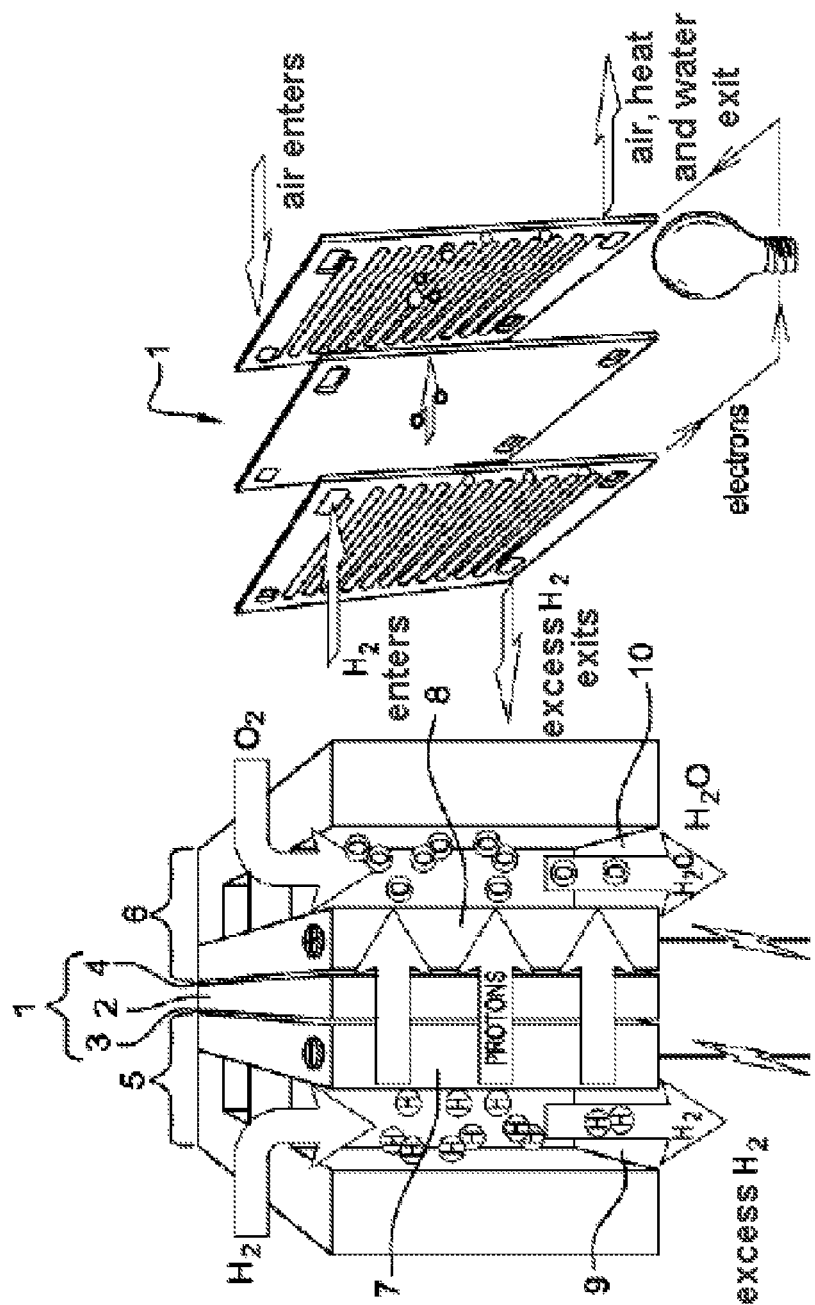
FIGS. 1a and 1b illustrate a diagram showing the operating principle behind a PEMFC fuel cell.

The present invention thus provides a method notably making it possible to deal with the consequences of accidental pollution with carboxyl-containing species and notably with carbon monoxide CO, ensuring the continued operation of a hydrogen fuel cell stack even in the presence of a high CO content.

By detecting the CO content in the hydrogen-based fuel, the present invention proposes to modify the in situ stoichiometry coefficient of the fuel so that a preset acceptable performance-loss threshold is not exceeded.

Generally, in the hydrogen oxidation reaction one hydrogen molecule produces 2 protons and 2 electrons. The hydrogen stream flow rate necessary to establish a current I (in A) is therefore given by the following equation:

$$Q_{H_2} \text{ (mol s}^{-1}) = \frac{I}{2 \times F} \quad (5)$$

where F is the Faraday constant (in $A \cdot s \cdot mol^{-1}$).

In fuel cell stack systems, hydrogen and air (or oxygen) are very often injected in excess (superstoichiometric operation) into the anode and cathode compartments, respectively. The hydrogen stream necessary to establish the current is therefore multiplied by the stoichiometry coefficient $St_{H_2}$:

$$Q_{H_2} \text{ (mol s}^{-1}) = St_{H_2} \times \frac{I}{2 \times F} \quad (6)$$

The stoichiometry coefficient corresponds to the excess of injected gas. In pure hydrogen, operation with a high stoichiometry, typically a stoichiometry of 1.5, ensures there is an excess of hydrogen and therefore ensures better access to the catalyst, thus improving performance. However, when CO is present in the hydrogen, a high stoichiometry increases the flow rate of injected CO and therefore causes a decrease in performance. The improvement obtained with a high stoichiometry is negligible relative to the loss generated by the presence of CO.

The Applicant has demonstrated that by optimizing a decrease in the stoichiometry coefficient when CO is present in the hydrogen, the impact on the performance of the electrode can be controlled.

This solution may be particularly effective in the case where a temporary malfunction of the purification device associated with a reformer leads to an abnormally high CO concentration in the hydrogen.

The choice of the stoichiometry to be employed when CO is present depends on a certain number of parameters such as the measured CO concentration, the electrode catalyst loading, or the operating temperature. In any case, the aim is to maintain an acceptable performance level (typically a performance loss lower than 10%). Different systems may operate with different stoichiometries but, in the present invention, the Applicant proposes to optimize the stoichiometry coefficient when CO pollution is present.

According to the present invention, it is thus proposed, starting with what is called a reference fuel cell operating voltage, corresponding to what is considered normal operation in the absence of a polluting agent, to determine an acceptable threshold voltage value. Typically, such a voltage may be considered to be about 90% of the reference voltage without there being a problem with poisoning by a polluting agent.

Starting with this preset threshold voltage, a flow rate is defined for the fuel stream contaminated with polluting agent, for example a flow rate $Q_{co}$ in the case where the polluting agent is CO, via a calibration curve, the flow rate thus defined corresponding to a first input parameter.

Moreover, the solution of the present invention requires the use of a CO detection device in the electrode, in order to define the second input parameter.

Prior-art detection means may be used for this purpose.

The reader may notably refer to the method for monitoring the CO concentration in the hydrogen feed of a PEM fuel cell described in the patent of General Motors: S. A. Grot, M. A. Meltser, S. Gutowski, J. K. Neutzler, R. L. Borup, K. Weisbrod, Method of monitoring CO concentrations in hydrogen feed to a PEM fuel cell, U.S. Pat. No. 6,063,516 A, 2000.

In this detection means the CO concentration is monitored by a probe formed from a small PEM cell and fed by the same hydrogen stream as the rest of the fuel cell. This cell has a small geometric area and a low catalyst loading, thus ensuring the presence of CO is detected with a good sensitivity. The performance loss measured by this probe is compared to a database in order to determine the concentration of CO present.

Another method allowing the concentration of CO to be determined has been provided by the Applicant: O. Lemaire, A. Franco, N. Guillet, Dispositif de détermination de la concentration en monoxyde de carbone et procédé. FR 2 937 139 A1, 2008. This method relates the characteristics of potential oscillations observable in the case of a $H_2$/CO mixture to the CO concentration in the hydrogen, also via a database.

Embodiment

Figure 2:
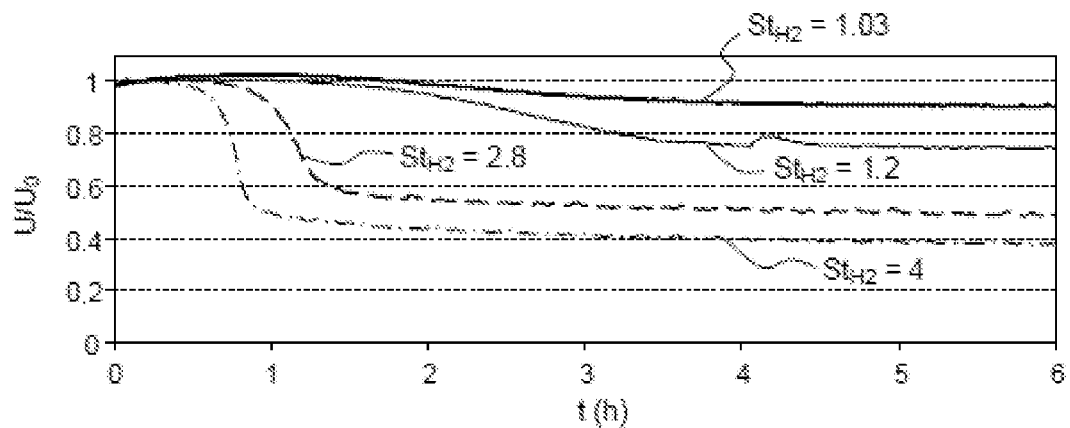
FIG. 2 illustrates the variation in the normalized cell voltage during exposure to 10 ppm CO with four different stoichiometry coefficients.

Four poisoning trials were carried out in which an electrode loaded with 300 $\mu g_{Pt}/cm^2$ was poisoned with 10 ppm CO in different hydrogen stoichiometries at 70° C. The stoichiometry coefficient values for the hydrogen were 1.03, 1.2, 2.8 and 4. FIG. 2 shows the results of exposing this electrode to the CO for 6 hours.

A similar performance loss could have been expected (a plateau at the same voltage value) for all the stoichiometry values seeing as all the trials used 10 ppm CO.

Likewise, an increase in stoichiometry could have simply decreased the time taken to reach this plateau. However, FIG. 2 clearly shows that the fuel gas stoichiometry has a very large impact on the performance loss in the presence of 10 ppm CO.

Specifically, the higher the stoichiometry coefficient is, the larger the performance loss and the faster the plateau is reached.

Figure 3:
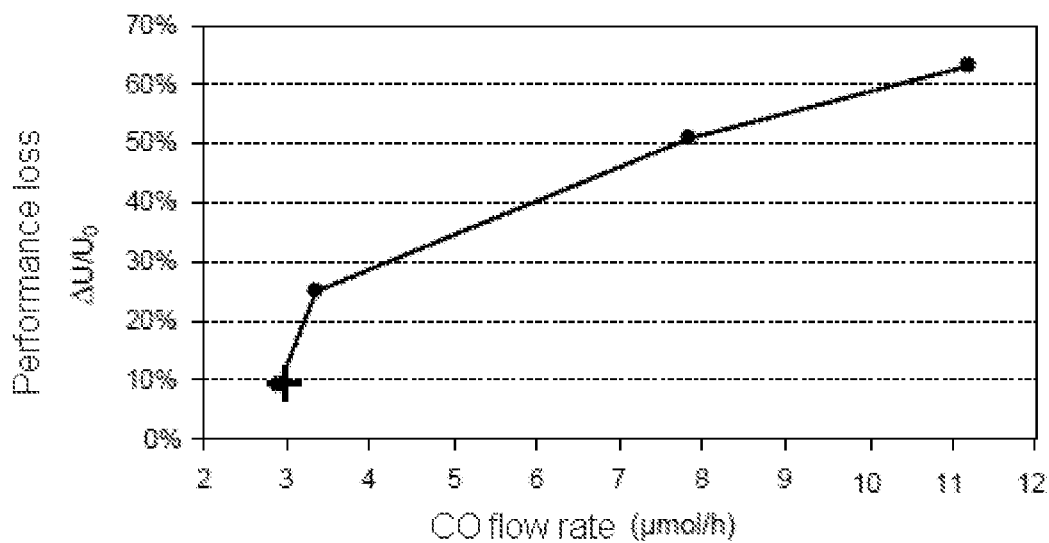
FIG. 3 illustrates the performance loss as a function of the CO flow rate.

FIG. 3 illustrates the performance loss due to the CO as a function of set CO flow rates with 10 ppm CO and four stoichiometry values.

Under the trial conditions used by the Applicant, the performance loss becomes smaller than 10% when the CO flow rate is lower than 3 µmol/h. It is thus possible, using a threshold voltage of 90% of the operating voltage in the absence of polluting agent, to define the first parameter $Q_{CO}$=3 µmol/h.

The detector employed allows the second parameter, corresponding to the mole fraction $x_{CO}$ of CO in the hydrogen to be obtained (by way of a device for measuring the concentration of CO); the CO flow rate is defined by the following expression:

$$Q_{CO}(\mu mol/h) = \frac{x_{CO}}{1-x_{CO}} \times St_{H_2} \times \frac{I}{2 \times F} \times 3600 \times 10^6 \quad (7)$$

Figure 4:
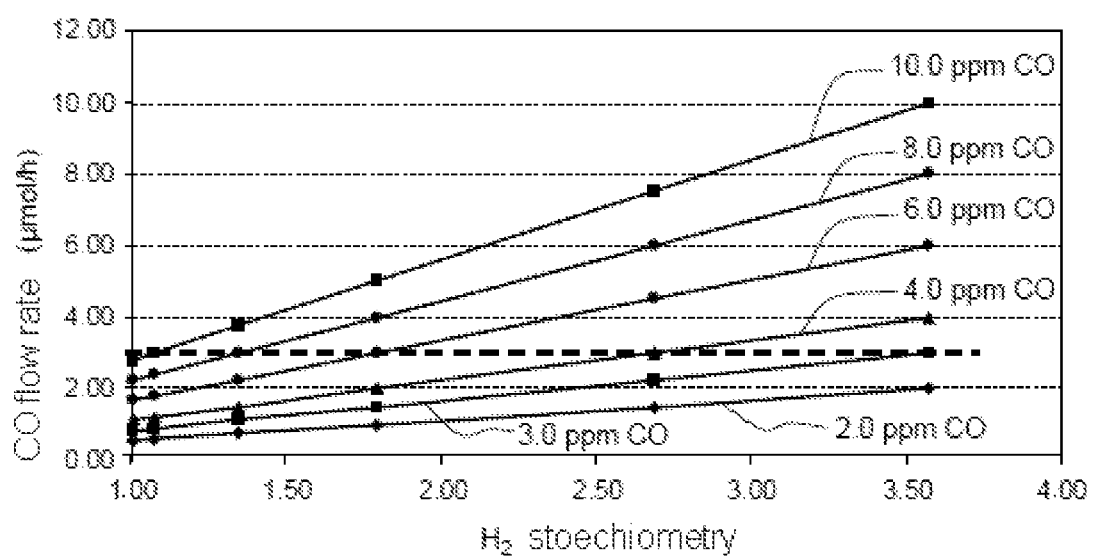
FIG. 4 illustrates the variation in the CO flow rate as a function of stoichiometry for a number of CO concentrations.

This expression allows FIG. 4 to be obtained which shows the stoichiometry, which it is desired to optimize, as a function of the preset CO concentration and the CO flow rate.

Thus, if the operator wishes to have an operating voltage requiring a CO flow rate lower than, for example, 3 µmol/h, they will therefore have to set the hydrogen stoichiometry between 1 and, for example:

3.57 if the measured CO concentration is 3 ppm;
2.68 if the measured CO concentration is 4 ppm;
1.79 if the measured CO concentration is 6 ppm;
1.34 if the measured CO concentration is 8 ppm; and
1.07 if the measured CO concentration is 10 ppm.

Using this method, if the CO measurement is not fixed but increases dynamically, the stoichiometry may be automatically decreased (while remaining higher than or equal to 1) depending on the measured concentration and for a critical CO flow rate value.

This method is also applicable to MEAs having different features (for example different catalyst loads) and with other operating conditions (such as operating temperature or relative humidity).

The invention claimed is:

1. A method for optimizing a fuel feed of a fuel cell stack catalytic electrode, a fuel cell stack containing a cell comprising a proton exchange membrane located between said catalytic electrode and another electrode, and operating in a superstoichiometric mode, said fuel comprising at least one carbonyl-containing polluting agent compound, said compound reacting on said catalytic electrode, comprising the following steps:

defining a reference voltage for said cell when fed with a fuel exempt from polluting agent;

defining a threshold voltage corresponding to a preset operating voltage of said cell equal to a percentage of said reference voltage;

defining a calibration curve for given operating conditions, relating said threshold voltage to a flow rate of polluting agent and allowing a first parameter corresponding to the flow rate of polluting agent to be defined;

detecting the amount of polluting agent in order to define a second parameter corresponding to the content of polluting agent present in said fuel; and determining a maximum stoichiometry coefficient for said fuel stream, depending on said two parameters, under given operating conditions.

2. The method for optimizing the fuel feed of a fuel cell stack catalytic electrode as claimed in claim 1, in which the fuel is based on hydrogen.

3. The method for optimizing the fuel feed of a fuel cell stack catalytic electrode as claimed in claim 1, in which the fuel is based on reformed hydrogen.

4. The method for optimizing the fuel feed of a fuel cell stack catalytic electrode as claimed in claim 1, in which the fuel comprises a carbonyl-containing polluting agent, possibly CO.

5. The method for optimizing the fuel feed of a fuel cell stack catalytic electrode as claimed in claim 1, in which the threshold voltage is equal to about 90% of the reference voltage.

6. The method for optimizing the fuel feed of a fuel cell stack catalytic electrode as claimed in claim 1, in which the means for detecting said polluting agent comprise a probe formed from a small PEM cell and fed with the fuel stream.

7. The method for optimizing the fuel feed of a fuel cell stack catalytic electrode as claimed in claim 1, in which the means for detecting said polluting agent comprise means for detecting cell voltage oscillations allowing the content of carbonyl-containing polluting species to be defined.

* * * * *